United States Patent
Locke et al.

(10) Patent No.: US 9,777,851 B2
(45) Date of Patent: Oct. 3, 2017

(54) DISC PUMP VALVE WITH PERFORMANCE ENHANCING VALVE FLAP

(71) Applicant: KCI Licensing Inc., San Antonio, TX (US)

(72) Inventors: Christopher Brian Locke, Bournemouth (GB); James Luckemeyer, San Antonio, TX (US)

(73) Assignee: KCI Licensing, Inc., San Antonio, TX (US)

( * ) Notice: Subject to any disclaimer, the term of this patent is extended or adjusted under 35 U.S.C. 154(b) by 326 days.

(21) Appl. No.: 13/865,764

(22) Filed: Apr. 18, 2013

(65) Prior Publication Data

US 2013/0276906 A1    Oct. 24, 2013

Related U.S. Application Data

(60) Provisional application No. 61/635,678, filed on Apr. 19, 2012.

(51) Int. Cl.
*F16K 15/14* (2006.01)
*F04B 43/04* (2006.01)
(Continued)

(52) U.S. Cl.
CPC ............ *F16K 15/14* (2013.01); *F04B 43/043* (2013.01); *F04B 45/047* (2013.01);
(Continued)

(58) Field of Classification Search
CPC .. F04B 19/006; F04B 39/102; F04B 39/1066; F04B 45/047
(Continued)

(56) References Cited

U.S. PATENT DOCUMENTS

| 1,355,846 A | 10/1920 | Rannells |
| 2,547,758 A | 4/1951 | Keeling |

(Continued)

FOREIGN PATENT DOCUMENTS

| AU | 550575 A1 | 3/1986 |
| AU | 745271 | 4/1999 |

(Continued)

OTHER PUBLICATIONS

International Search Report and Written Opinion for corresponding PCT/US2013/037196, dated Jul. 4, 2013.
(Continued)

*Primary Examiner* — Devon Kramer
*Assistant Examiner* — Connor Tremarche

(57) ABSTRACT

A disc pump valve for controlling the flow of fluid through a disc pump includes a first plate having first plate apertures and a second plate having second plate apertures both extending generally perpendicular through the first plate and the second plate, respectively. The second plate apertures are substantially offset from the first plate apertures. The disc pump valve also includes a sidewall disposed between the first plate and second plate. A valve flap is disposed and moveable between the first plate and second plate. The valve flap includes flap apertures substantially offset from the first plate apertures and substantially aligned with the second plate apertures, and low-mass areas. The low-mass areas are offset from the first plate apertures and second plate apertures. The valve flap moves between the first plate and second plate in response to a change in direction of differential pressure of the fluid outside the valve.

5 Claims, 7 Drawing Sheets

(51) Int. Cl.
*F04B 45/047* (2006.01)
*F16K 99/00* (2006.01)

(52) U.S. Cl.
CPC ........ *F16K 15/144* (2013.01); *F16K 99/0015* (2013.01); *F16K 99/0057* (2013.01); *F16K 2099/0094* (2013.01); *Y10T 137/0402* (2015.04); *Y10T 137/7859* (2015.04)

(58) Field of Classification Search
USPC .............. 137/15.01, 516.11, 516.23, 625.33; 417/479
See application file for complete search history.

(56) References Cited

U.S. PATENT DOCUMENTS

| | | |
|---|---|---|
| 2,632,443 A | 3/1953 | Lesher |
| 2,682,873 A | 7/1954 | Evans et al. |
| 2,910,763 A | 11/1959 | Lauterbach |
| 2,969,057 A | 1/1961 | Simmons |
| 3,066,672 A | 12/1962 | Crosby et al. |
| 3,367,332 A | 2/1968 | Groves |
| 3,520,300 A | 7/1970 | Flower, Jr. |
| 3,568,675 A | 3/1971 | Harvey |
| 3,648,692 A | 3/1972 | Wheeler |
| 3,682,180 A | 8/1972 | McFarlane |
| 3,826,254 A | 7/1974 | Mellor |
| 3,853,268 A * | 12/1974 | Schneider .............. G05D 23/10 137/625.33 |
| 4,080,970 A | 3/1978 | Miller |
| 4,096,853 A | 6/1978 | Weigand |
| 4,139,004 A | 2/1979 | Gonzalez, Jr. |
| 4,165,748 A | 8/1979 | Johnson |
| 4,184,510 A | 1/1980 | Murry et al. |
| 4,233,969 A | 11/1980 | Lock et al. |
| 4,245,630 A | 1/1981 | Lloyd et al. |
| 4,256,109 A | 3/1981 | Nichols |
| 4,261,363 A | 4/1981 | Russo |
| 4,275,721 A | 6/1981 | Olson |
| 4,284,079 A | 8/1981 | Adair |
| 4,297,995 A | 11/1981 | Golub |
| 4,333,468 A | 6/1982 | Geist |
| 4,373,519 A | 2/1983 | Errede et al. |
| 4,382,441 A | 5/1983 | Svedman |
| 4,392,853 A | 7/1983 | Muto |
| 4,392,858 A | 7/1983 | George et al. |
| 4,419,097 A | 12/1983 | Rowland |
| 4,465,485 A | 8/1984 | Kashmer et al. |
| 4,475,909 A | 10/1984 | Eisenberg |
| 4,480,638 A | 11/1984 | Schmid |
| 4,525,166 A | 6/1985 | Leclerc |
| 4,525,374 A | 6/1985 | Vaillancourt |
| 4,540,412 A | 9/1985 | Van Overloop |
| 4,543,100 A | 9/1985 | Brodsky |
| 4,548,202 A | 10/1985 | Duncan |
| 4,551,139 A | 11/1985 | Plaas et al. |
| 4,569,348 A | 2/1986 | Hasslinger |
| 4,605,399 A | 8/1986 | Weston et al. |
| 4,608,041 A | 8/1986 | Nielsen |
| 4,640,688 A | 2/1987 | Hauser |
| 4,655,754 A | 4/1987 | Richmond et al. |
| 4,664,662 A | 5/1987 | Webster |
| 4,710,165 A | 12/1987 | McNeil et al. |
| 4,733,659 A | 3/1988 | Edenbaum et al. |
| 4,743,232 A | 5/1988 | Kruger |
| 4,758,220 A | 7/1988 | Sundblom et al. |
| 4,787,888 A | 11/1988 | Fox |
| 4,826,494 A | 5/1989 | Richmond et al. |
| 4,838,883 A | 6/1989 | Matsuura |
| 4,840,187 A | 6/1989 | Brazier |
| 4,863,449 A | 9/1989 | Therriault et al. |
| 4,872,450 A | 10/1989 | Austad |
| 4,878,901 A | 11/1989 | Sachse |
| 4,897,081 A | 1/1990 | Poirier et al. |
| 4,906,233 A | 3/1990 | Moriuchi et al. |
| 4,906,240 A | 3/1990 | Reed et al. |
| 4,919,654 A | 4/1990 | Kalt |
| 4,941,882 A | 7/1990 | Ward et al. |
| 4,953,565 A | 9/1990 | Tachibana et al. |
| 4,969,880 A | 11/1990 | Zamierowski |
| 4,985,019 A | 1/1991 | Michelson |
| 5,037,397 A | 8/1991 | Kalt et al. |
| 5,086,170 A | 2/1992 | Luheshi et al. |
| 5,092,858 A | 3/1992 | Benson et al. |
| 5,100,396 A | 3/1992 | Zamierowski |
| 5,134,994 A | 8/1992 | Say |
| 5,149,331 A | 9/1992 | Ferdman et al. |
| 5,167,613 A | 12/1992 | Karami et al. |
| 5,176,663 A | 1/1993 | Svedman et al. |
| 5,215,522 A | 6/1993 | Page et al. |
| 5,232,453 A | 8/1993 | Plass et al. |
| 5,261,893 A | 11/1993 | Zamierowski |
| 5,278,100 A | 1/1994 | Doan et al. |
| 5,279,550 A | 1/1994 | Habib et al. |
| 5,298,015 A | 3/1994 | Komatsuzaki et al. |
| 5,342,376 A | 8/1994 | Ruff |
| 5,344,415 A | 9/1994 | DeBusk et al. |
| 5,358,494 A | 10/1994 | Svedman |
| 5,437,622 A | 8/1995 | Carion |
| 5,437,651 A | 8/1995 | Todd et al. |
| 5,527,293 A | 6/1996 | Zamierowski |
| 5,549,584 A | 8/1996 | Gross |
| 5,556,375 A | 9/1996 | Ewall |
| 5,607,388 A | 3/1997 | Ewall |
| 5,636,643 A | 6/1997 | Argenta et al. |
| 5,645,081 A | 7/1997 | Argenta et al. |
| 6,071,267 A | 6/2000 | Zamierowski |
| 6,135,116 A | 10/2000 | Vogel et al. |
| 6,241,747 B1 | 6/2001 | Ruff |
| 6,287,316 B1 | 9/2001 | Agarwal et al. |
| 6,345,623 B1 | 2/2002 | Heaton et al. |
| 6,488,643 B1 | 12/2002 | Tumey et al. |
| 6,493,568 B1 | 12/2002 | Bell et al. |
| 6,553,998 B2 | 4/2003 | Heaton et al. |
| 6,814,079 B2 | 11/2004 | Heaton et al. |
| 7,540,301 B2 * | 6/2009 | Tuymer .............. F04B 39/1053 137/512.1 |
| 2002/0077661 A1 | 6/2002 | Saadat |
| 2002/0115951 A1 | 8/2002 | Norstrem et al. |
| 2002/0120185 A1 | 8/2002 | Johnson |
| 2002/0129857 A1 * | 9/2002 | Xu ........................... F15C 5/00 137/625.28 |
| 2002/0134434 A1 * | 9/2002 | Schiavone ........... F04B 39/1013 137/516.13 |
| 2002/0143286 A1 | 10/2002 | Tumey |
| 2006/0079852 A1 | 4/2006 | Bubb et al. |
| 2010/0310397 A1 | 12/2010 | Janse Van Rensburg |
| 2010/0310398 A1 * | 12/2010 | Janse Van Rensburg F04F 7/00 417/488 |
| 2011/0186765 A1 | 8/2011 | Jaeb et al. |

FOREIGN PATENT DOCUMENTS

| | | |
|---|---|---|
| AU | 755496 | 2/2002 |
| CA | 2005436 | 6/1990 |
| DE | 26 40 413 A1 | 3/1978 |
| DE | 43 06 478 A1 | 9/1994 |
| DE | 295 04 378 U1 | 10/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 B1 | 8/2004 |
| GB | 692578 | 6/1953 |
| GB | 2 195 255 A | 4/1988 |
| GB | 2 197 789 A | 6/1988 |
| GB | 2 220 357 A | 1/1990 |
| GB | 2 235 877 A | 3/1991 |
| GB | 2 329 127 B | 3/1999 |
| GB | 2 333 965 A | 8/1999 |
| JP | 4129536 | 4/1992 |
| SG | 71559 | 4/2002 |
| WO | 80/02182 | 10/1980 |

(56) References Cited

FOREIGN PATENT DOCUMENTS

| WO | 87/04626 | 8/1987 |
|----|----------|--------|
| WO | 90/10424 | 9/1990 |
| WO | 93/09727 | 5/1993 |
| WO | 94/20041 | 9/1994 |
| WO | 96/05873 | 2/1996 |
| WO | 97/18007 | 5/1997 |
| WO | 99/13793 | 3/1999 |

OTHER PUBLICATIONS

N.A. Bagautdinov, "Variant of External Vacuum Aspiration in the Treatment of Purulent Diseases of the Soft Tissues," Current Problems in Modern Clinical Surgery: Interdepartmental Collection, edited by V. Ye Volkov et al. (Chuvashia State University, Cheboksary, U.S.S.R. 1986);pp. 94-96 (certified translation).

Louis C. Argenta, MD and Michael J. Morykwas, PhD; "Vacuum-Assisted Closure: A New Method for Wound Control and Treatment: Animal Studies & Basic Foundation"; Annals of Plastic Surgery, vol. 38, No. 6, Jun. 1997; pp. 553-562.

Susan Mendez-Eastmen, RN; "When Wounds Won't Heal" RN Jan. 1998, vol. 61 (1); Medical Economics Company, Inc., Montvale, NJ, USA; pp. 20-24.

James H. Blackburn, II, MD, et al; "Negative-Pressure Dressings as a Bolster for Skin Grafts"; Annals of Plastic Surgery, vol. 40, No. 5, May 1998, pp. 453-457.

John Masters; "Reliable, Inexpensive and Simple Suction Dressings"; Letters to the Editor, British Journal of Plastic Surgery, 1998, vol. 51 (3), p. 267; Elsevier Science/The British Association of Plastic Surgeons, UK.

S.E. Greer, et al "The Use of Subatmospheric Pressure Dressing Therapy to Close Lymphocutaneous Fistulas of the Groin" British Journal of Plastic Surgery (2000), vol. 53, pp. 484-487.

George V. Letsou, MD., et al; "Stimulation of Adenylate Cyclase Activity in Cultured Endothelial Cells Subjected to Cyclic Stretch"; Journal of Cardiovascular Surgery, vol. 31, 1990, pp. 634-639.

Orringer, Jay, et al; "Management of Wounds in Patients with Complex Enterocutaneous Fistulas"; Surgery, Gynecology & Obstetrics, Jul. 1987, vol. 165, pp. 79-80.

International Search Report for PCT International Application PCT/GB95/01983; dated Nov. 23, 1995.

PCT International Search Report for PCT International Application PCT/GB98/02713; dated Jan. 8, 1999.

PCT Written Opinion; PCT International Application PCT/GB98/02713; dated Jun. 8, 1999.

PCT International Examination and Search Report, PCT International Application PCT/GB96/02802; dated Jan. 15, 1998 & Apr. 29, 1997.

PCT Written Opinion, PCT International Application PCT/GB96/02802; Sep. 3, 1997.

Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.

Kostyuchenok, B.M., et al; "Vacuum Treatment in the Surgical Management of Purulent Wounds"; Vestnik Khirurgi, Sep. 1986, pp. 18-21 and 6 page English translation thereof.

Davydov, Yu. A., et al; "Vacuum Therapy in the Treatment of Purulent Lactation Mastitis"; Vestnik Khirurgi, May 14, 1986, pp. 66-70, and 9 page English translation thereof.

Yusupov. Yu. N., et al; "Active Wound Drainage", Vestnik Khirurgi, vol. 138, Issue 4, 1987, and 7 page English translation thereof.

Davydov, Yu. A., et al; "Bacteriological and Cytological Assessment of Vacuum Therapy for Purulent Wounds"; Vestnik Khirurgi, Oct. 1988, pp. 48-52, and 8 page English translation thereof.

Davydov, Yu. A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.

Chariker, Mark E., M.D., et al; "Effective Management of incisional and cutaneous fistulae with closed suction wound drainage"; Contemporary Surgery, vol. 34, Jun. 1989, pp. 59-63.

Egnell Minor, Instruction Book, First Edition, 300 7502, Feb. 1975, pp. 24.

Egnell Minor: Addition to the Users Manual Concerning Overflow Protection—Concerns all Egnell Pumps, Feb. 3, 1983, p. 1.

Svedman, P.: "Irrigation Treatment of Leg Ulcers", The Lancet, Sep. 3, 1983, pp. 532-534.

Chinn, Steven D. et al.: "Closed Wound Suction Drainage", The Journal of Foot Surgery, vol. 24, No. 1, 1985, pp. 76-81.

Arnljots, Björn et al.: "Irrigation Treatment in Split-Thickness Skin Grafting of Intractable Leg Ulcers", Scand J. Plast Reconstr. Surg., vol. 19, 1985, pp. 211-213.

Svedman, P.: "A Dressing Allowing Continuous Treatment of a Biosurface", IRCS Medical Science: Biomedical Technology, Clinical Medicine, Surgery and Transplantation, vol. 7, 1979, p. 221.

Svedman, P. et al.: "A Dressing System Providing Fluid Supply and Suction Drainage Used for Continuous or Intermittent Irrigation", Annals of Plastic Surgery, vol. 17, No. 2, Aug. 1986, pp. 125-133.

K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.

G. Živadinovic, V. Ð ukié, Ž. Maksimović, Ð . Radak, and P. Peška, "Vacuum Therapy in the Treatment of Peripheral Blood Vessels," Timok Medical Journal 11 (1986), pp. 161-164 (certified translation).

F.E. Johnson, "An Improved Technique for Skin Graft Placement Using a Suction Drain," Surgery, Gynecology, and Obstetrics 159 (1984), pp. 584-585.

A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (certified translation).

M. Schein, R. Saadia, J.R. Jamieson, and G.A.G. Decker, "The 'Sandwich Technique' in the Management of the Open Abdomen," British Journal of Surgery 73 (1986), pp. 369-370.

D.E. Tribble, "An Improved Sump Drain-Irrigation Device of Simple Construction," Archives of Surgery 105 (1972) pp. 511-513.

C.E. Tennant, "The Use of Hypermia in the Postoperative Treatment of Lesions of the Extremities and Thorax," Journal of the American Medical Association 64 (1915), pp. 1548-1549.

Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.

V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").

V.A. Kuznetsov & N.A. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").

V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").

V.A.C. ® Therapy Clinical Guidelines: A Reference Source for Clinicians (Jul. 2007).

\* cited by examiner

DISC PUMP VALVE WITH PERFORMANCE ENHANCING VALVE FLAP

The present invention claims the benefit, under 35 USC §119(e), of the filing of U.S. Provisional Patent Application Ser. No. 61/635,678, entitled "DISC PUMP VALVE WITH PERFORMANCE ENHANCING VALVE FLAP," filed Apr. 19, 2012, by Locke et al., which is incorporated herein by reference for all purposes.

BACKGROUND OF THE INVENTION

Field of the Invention

The illustrative embodiments relate generally to a disc-pump valve for managing fluid flow therethrough and, more specifically, to a valve having a flap that is centrally biased between two plates and capable of movement between an open and a closed position.

Description of Related Art

Conventional valves typically operate at frequencies below 500 Hz. For example, many conventional compressors typically operate at 50 or 60 Hz. A linear resonance compressor known in the art operates between 150 and 350 Hz. Some applications, require valves that are capable of operating at much higher frequencies, 20 kHz and higher, for example. Valves that operate at these high frequencies are not commonly available. For example, many portable electronic devices, including medical devices, require pumps that are relatively small in size to deliver a positive pressure or to provide a vacuum. Consequently, these relatively small pumps require even smaller valves that must operate at very high frequencies to be effective. Moreover, these valves must operate at frequencies beyond the range of human hearing so that the valves are inaudible in operation. To operate at these high frequencies, the valve must be responsive to a high frequency oscillating pressure that can be rectified to create a net flow of fluid through the pump.

SUMMARY

A disc pump valve for controlling the flow of fluid through a disc pump comprises a first plate having first plate apertures extending generally perpendicular through the first plate and a second plate having second plate apertures extending generally perpendicular through the second plate. The second plate apertures are substantially offset from the first plate apertures. The disc pump valve also includes a sidewall disposed between the first plate and second plate. The sidewall being closed around the perimeter of the first plate and second plate to form a cavity between the first plate and the second plate. The disc pump valve also includes a valve flap disposed and moveable between the first plate and second plate. The valve flap comprises flap apertures substantially offset from the first plate apertures and substantially aligned with the second plate apertures. In addition, the valve flap comprises low-mass areas substantially offset from both the first plate apertures and the second plate apertures. The valve flap is motivated between the first plate and the second plate in response to a change in direction of the differential pressure of the fluid outside the valve.

A method of manufacturing a disc pump valve for controlling the flow of fluid through a disc pump comprises providing a first plate having first plate apertures extending generally perpendicular through the first plate. The method further comprises providing a second plate having second plate apertures extending generally perpendicular through the second plate, the second plate apertures being substantially offset from the first plate apertures. The method includes providing a sidewall disposed between the first plate and the second plate to form a cavity between the first plate and the second plate, and providing a valve flap between the first plate and the second plate. The valve flap comprises flap apertures substantially offset from the first plate apertures and substantially aligned with the second plate apertures and low-mass areas substantially offset from both the first plate apertures and the second plate apertures.

A disc pump includes a pump body having a substantially elliptically shaped side wall closed at one end by an end wall and the other end by a pair of internal plates adjacent each other to form a cavity within the pump body for containing fluids. The disc pump also includes an actuator formed by the internal plates wherein one of the internal plates is operatively associated with a central portion of the other internal plate and adapted to cause an oscillatory motion at a frequency (f) thereby generating radial pressure oscillations of the fluid within the cavity. A first aperture extends through the actuator to enable fluid to flow through the cavity, and a second aperture extends through the end wall to enable the fluid to flow through the cavity. The disc pump includes a disc pump valve disposed in at least one of the first aperture and the second aperture. The disc pump valve has a first plate having first plate apertures extending generally perpendicular through the first plate and a second plate having second plate apertures extending generally perpendicular through the second plate. The second plate apertures are substantially offset from the first plate apertures. A sidewall is disposed between the first plate and the second plate to form a cavity between the first plate and the second plate, and a valve flap is disposed between the first plate and the second plate. The valve flap includes flap apertures substantially offset from the first plate apertures and substantially aligned with the second plate apertures. In addition, the valve flap includes low-mass areas that are substantially offset from both the first plate apertures and the second plate apertures.

Other objects, features, and advantages of the illustrative embodiments are disclosed herein and will become apparent with reference to the drawings and detailed description that follow.

DETAILED DESCRIPTION OF ILLUSTRATIVE EMBODIMENTS

In the following detailed description of illustrative embodiments, reference is made to the accompanying drawings that form a part hereof. By way of illustration, the drawings show specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

A micropump, such as a disc pump, is a suitable application for a valve that operates at a high frequency, e.g., beyond the range of human hearing. At such frequencies, the pump may be extremely small in size and suitable for integration into a wide range of portable electronic devices where pressure or vacuum delivery is required. The disc pump may include an actuator, such as a piezoelectric actuator, to cause oscillatory motion and displacement oscillations of a driven end wall within the disc pump. When the actuator generates an oscillatory motion of the end wall, the displacement oscillations may generate radial oscillations of the fluid pressure within the pump. These radial oscillations of fluid pressure may cause fluid to flow through apertures in the pump base and apertures in the end wall, which may be inlet apertures and outlet apertures, respectively. To generate a pressure differential, the pump includes one or more valves that allow fluid to flow through the disc pump in only one direction. For the valves to operate at the high frequencies generated by the actuator, the valves have an extremely fast response time such that the valves are able to open and close on a time scale significantly shorter than the time scale of the pressure variations.

Figure 1:
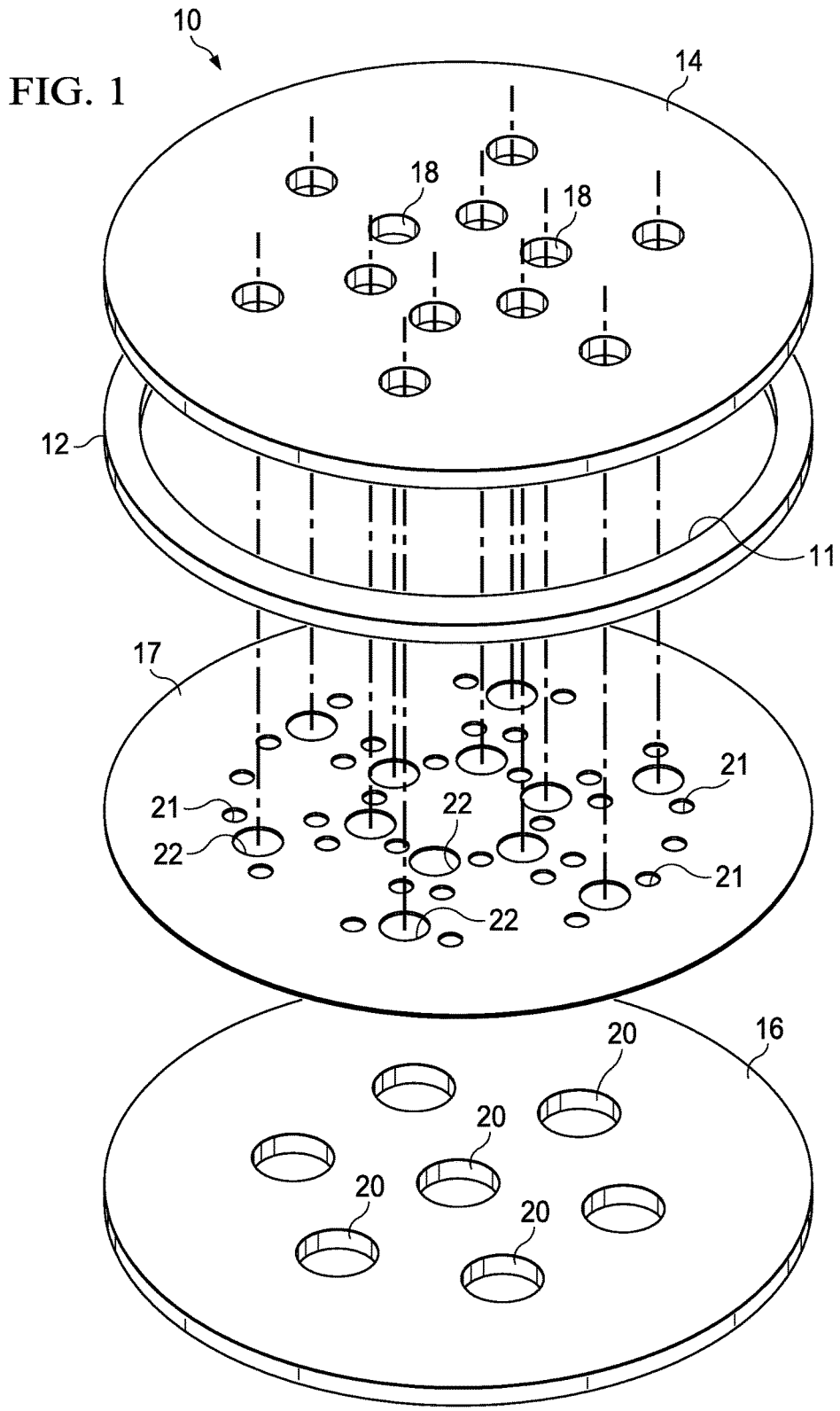
FIG. 1 shows an exploded, perspective view of an illustrative embodiment of a disc pump valve.
Figure 2:
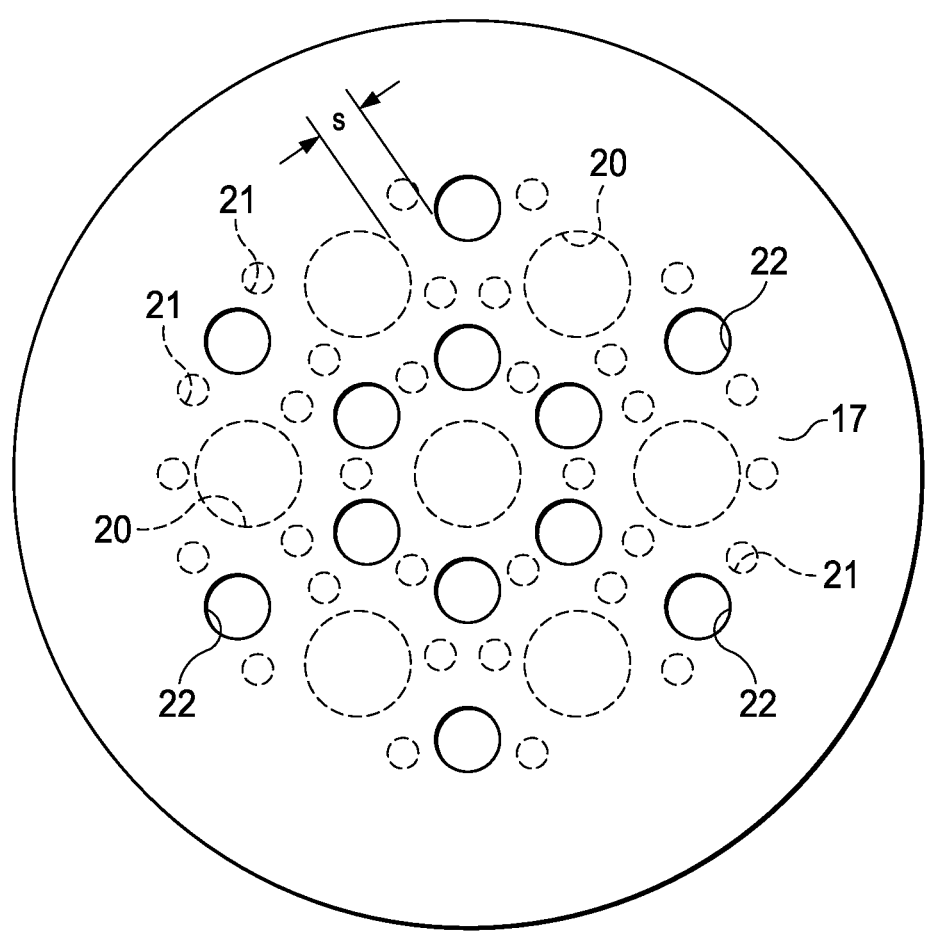
FIG. 2 shows a top view of the valve of FIG. 1.

Referring to FIGS. 1-2, a disc pump valve such as a valve 10 is shown according to an illustrative embodiment. The disc pump valve 10 comprises a substantially cylindrical wall 11 closed at one end by a retention plate 14 and at the other end by a sealing plate 16. The cylindrical wall is formed of an annular member 12. The inside surfaces of the cylindrical wall 11, retention plate 14, and the sealing plate 16 form a cavity 15 (not shown in FIG. 1 but analogous to the cavity 115 of FIGS. 3 and 4). The valve 10 further comprises a substantially circular valve flap 17 disposed between the retention plate 14 and the sealing plate 16. In FIG. 1, the valve flap 17 is biased to be adjacent the sealing plate 16 and offset from the retention plate 14 when the valve is at equilibrium and there is no pressure differential across the valve. In other embodiments, the valve flap may be biased adjacent the retention plate 14 or centrally biased between the sealing plate 16 and retention plate 14.

The valve flap 17 is a thin layer that may be constructed of a polymer sheet, such as a polymeric (e.g., Mylar) sheet having a thickness of about 1.5 to about 3 microns. The valve flap 17 includes flap apertures 22, e.g., holes, that align with retention plate apertures 18 of the retention plate 14 when the valve 10 is assembled. Conversely, the valve flap 17 comprises a solid sheet in the areas that overlie sealing plate apertures 20 of the sealing plate 16. The valve flap 17 includes reduced-mass regions in the areas of the valve flap 17 between the flap apertures 22 that do not overlie the sealing plate apertures 20 of the sealing plate 116. For example, in FIG. 1, the reduced-mass regions are shown as low-mass areas 21 located in regions of the valve flap 17 that are interstitial to the sealing plate apertures 20 of the sealing plate 16 and retention plate apertures 18 of the retention plate 14 in a top view.

As described in more detail below, the valve 10 operates in response to the radial pressure oscillations and corresponding airflow that result from the operation of a disc pump. Within the disc pump, radial pressure oscillations within the portion of the disc pump adjacent the valve 10 cause fluid flow and pressure differential fluctuations across the valve 10. As the pressure differential across the valve 10 fluctuates, the valve flap 17 is motivated between the retention plate 14 and the sealing plate 16. For the valve 10 to be highly responsive to the pressure differential fluctuations, the performance of the valve 10 may be enhanced by reducing the mass of the valve flap 17. Thus, the valve flap 17 includes a reduced-mass region that comprises the portion of the valve flap 17 outside the flap apertures 22 and outside that portion of the valve flap 17 covering the sealing plate apertures 20. The mass of the valve flap 17 may be reduced in any portion of the reduced-mass region. In one embodiment, for example, the mass of the valve flap 17 may be reduced by reducing the thickness of the valve flap 17 in portions of the reduced-mass region to form low-mass areas 21 in portions of the reduced-mass region, as illustrated in the enlarged central portion of the valve flap 17 shown in FIG. 2. These low-mass areas may be, for example, indentations or dimples that do not extend through the valve flap 17 or mass-reducing apertures such as holes that vary in size depending upon the desired reduction in the mass of the valve flap 17.

In an embodiment in which the reduced-mass regions comprise low-mass areas 21 of varying sizes, smaller low-mass areas 21 may be located near the periphery of the valve flap 17 and larger low-mass areas 21 may be located near the center of the valve flap 17. This variance in the size of the low-mass areas 21 may result in a more robust valve flap 17 near the periphery of the valve 10 and lighter and more responsive valve flap 17 at the center of the valve 10. Employing a similar rationale, the reduced-mass regions may comprise low-mass areas 21 that vary in frequency from the center of the valve flap 17 toward the periphery of the valve flap 17 in another embodiment. For example, the valve flap 17 may comprise a lower frequency of low-mass areas 21 near the periphery of the valve flap 17 and a higher frequency of low-mass areas 21 near the center of the valve flap 17.

Figure 3:
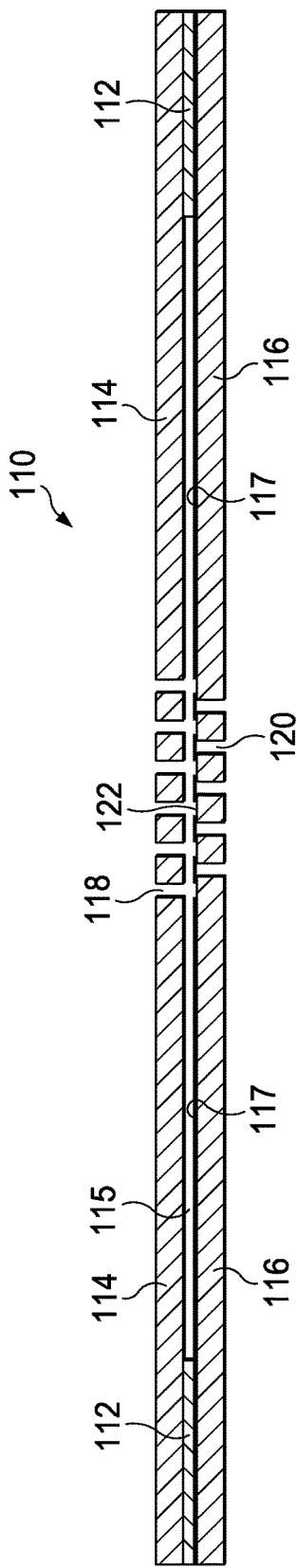
FIG. 3 is a cross-sectional view of an illustrative embodiment of a disc pump valve in a closed position.
Figure 4:
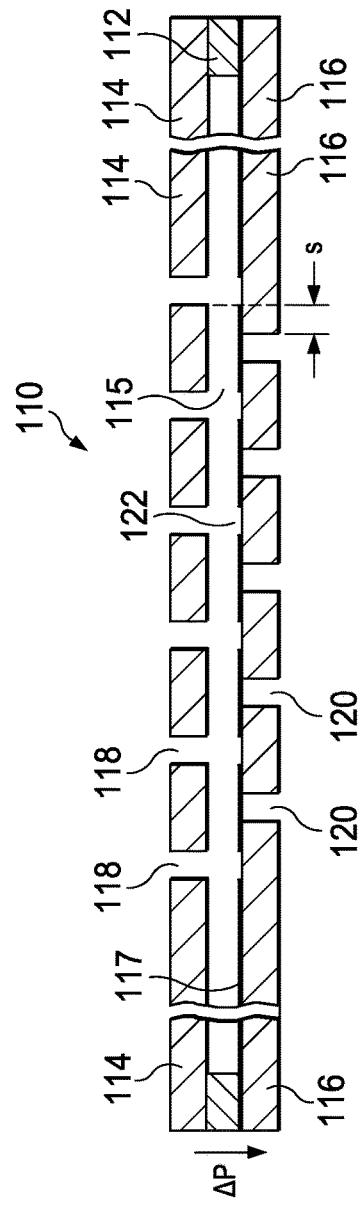
FIG. 4 is a broken cross-sectional view of the valve of FIG. 3.
Figure 7:
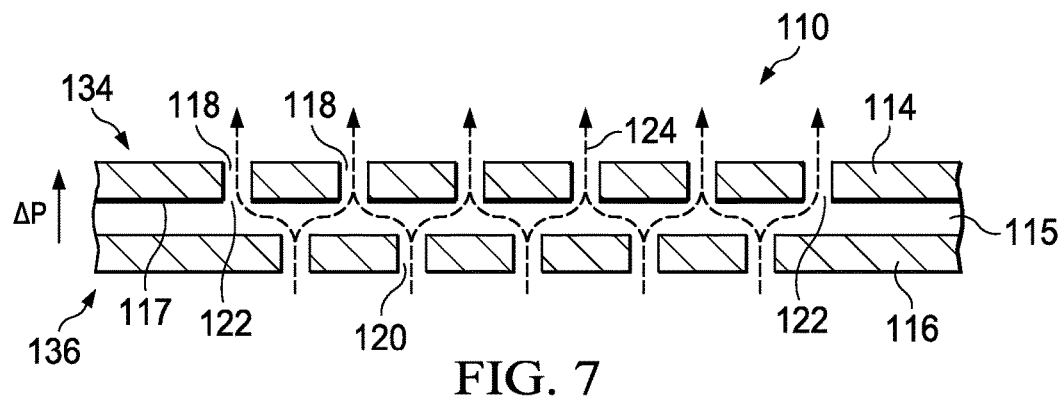
FIG. 7 is a broken, cross-section view of the valve of FIG. 1 in an open position.
Figure 9:
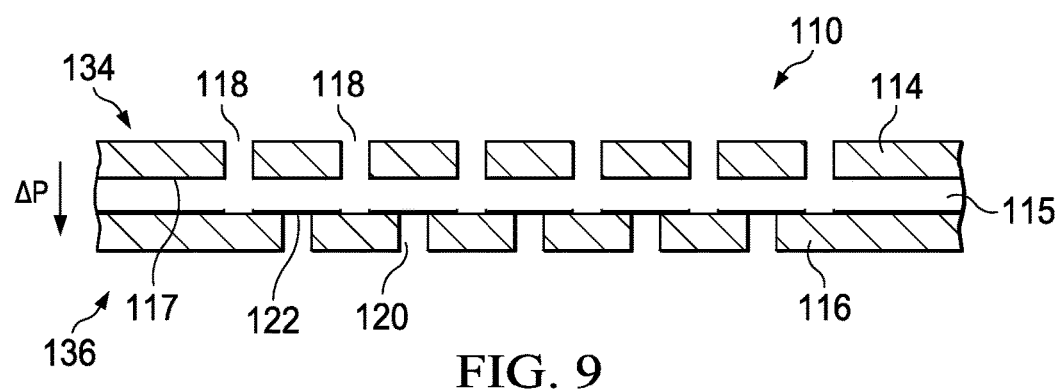
FIG. 9 is a broken, cross-section view of the valve of FIG. 1 in the closed position.

FIGS. 3-4 show another illustrative embodiment of a valve 110 and a valve flap 117 in a section view to illustrate the functionality of the valve 110. The valve 110 may include the components of and operate in a manner similar to the valve 10 of FIGS. 1-2. Similar components may have similar reference numerals that are indexed by 100. As installed in the valve 110, the valve flap 117 has a peripheral portion attached to a cylindrical wall 111 at the border of an annular member 112 so that the peripheral portion is immobilized in a direction substantially perpendicular the surface of the valve flap 117. The remainder of the valve flap 117 is sufficiently flexible so that when a force is applied to either surface of the valve flap 117, the force overcomes the bias of the valve flap 117 and motivates the valve flap 117 either away from a sealing plate 116 or away from a retention plate 114. For example, FIG. 7 illustrates that the central portion of the valve 110 is in an open position when the valve flap 117 is motivated away from the sealing plate 116, and FIG. 9 illustrates that the valve 110 is in a closed position when the valve flap 117 is motivated away from the retention plate 114.

Figure 8:
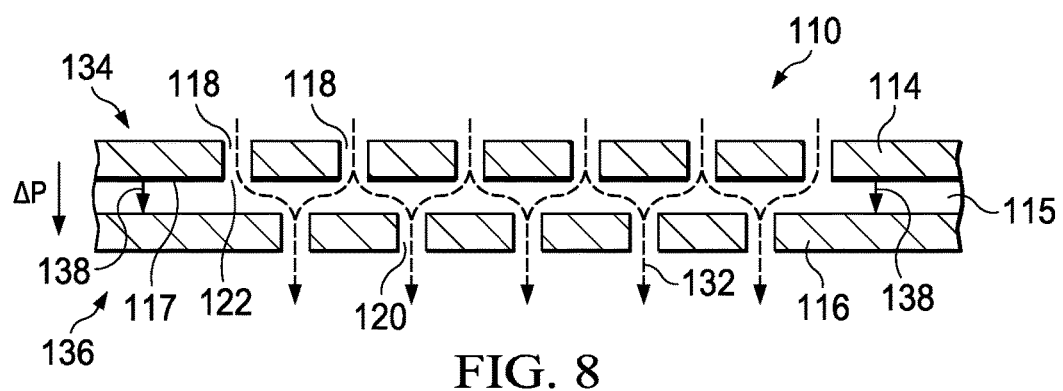
FIG. 8 is a broken, cross-section view of the valve of FIG. 1 as the valve begins to transition from the open position to a closed position.

The retention plate 114 and the sealing plate 116 have retention plate apertures 118 and sealing plate apertures 120, respectively, which extend through each plate. The valve flap 117 also has flap apertures 122 that are generally aligned with the retention plate apertures 118 of the retention plate 114 to provide a passage through which fluid, including a gas or liquid, may flow as indicated by the dashed arrows 124 in FIG. 5C. Alternatively, the flap apertures 122 in the valve flap 117 may be partially aligned, i.e., having only a partial overlap, with the retention plate apertures 118 in the retention plate 114. The retention plate apertures 118, the sealing plate apertures 120, and the flap apertures 122 may be of substantially uniform size and shape. In other embodiments, the retention plate apertures 118, the sealing plate apertures 120, and the flap apertures 122 may be of different diameters as shown in FIGS. 1-2. In still another embodiment, the retention plate apertures 118, the sealing plate apertures 120, and the flap apertures 122 may have different shapes such as non-circular, for example. In one embodiment, the retention plate apertures 118 and the sealing plate apertures 120 form an alternating pattern across the surface of the plates. In other embodiments, the retention plate apertures 118, the sealing plate apertures 120, and the flap apertures 122 may be arranged in different patterns without affecting the operation of the valve 110 with respect to the functioning of the individual pairings of retention plate apertures 118, sealing plate apertures 120, and flap apertures 122 as illustrated by individual sets of the dashed arrows 124 as shown in FIGS. 7-8. The pattern of retention plate apertures 118, sealing plate apertures 120, and flap apertures 122 may be designed to increase or decrease the number of holes to control the total flow of fluid through the valve 110 as required. For example, the number of the retention plate apertures 118, the sealing plate apertures 120, and the flap apertures 122 may be increased to increase the flow of fluid through the valve 110. Similarly, the number of the retention plate apertures 118, the sealing plate apertures 120, and the flap aperture 122 may be decreased to decrease the flow of fluid through the valve 110.

When the valve flap 117 is motivated away from the retention plate 114 so that it rests against the sealing plate 116, as shown in FIG. 4, the valve 110 is in a "closed position." In the closed position, the flap apertures 122 of the valve flap 117 are offset or not aligned with the sealing plate apertures 120. In the closed position, the flow of fluid through the sealing plate 116 is blocked or covered by the solid portions of the valve flap 117. Conversely, when the valve flap 117 is motivated away from the sealing plate 116 so that it rests against the retention plate 114, the valve in is the "open position." In the open position, the flap apertures 122 of the valve flap 117 are aligned with the retention plate apertures 118. In the open position, the flow of fluid through the sealing plate 116 and the retention plate 114 is not blocked or covered by the solid portions of the valve flap 117.

Figure 5A:
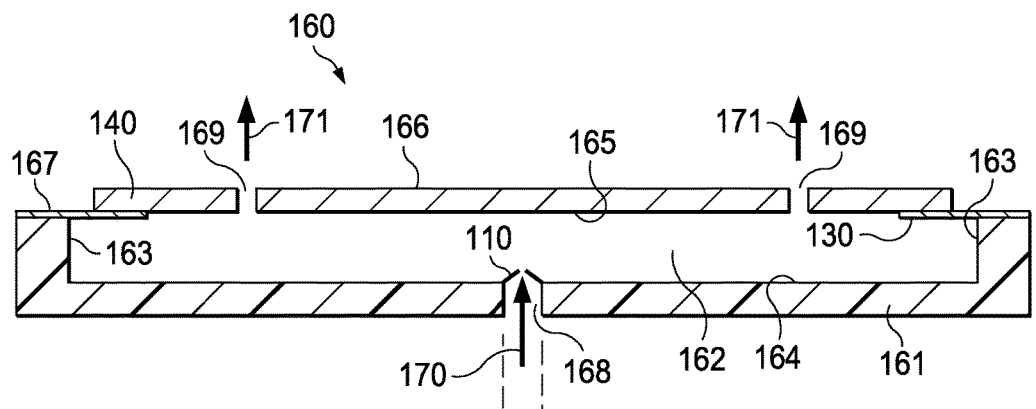
FIG. 5A shows a cross-sectional view of a disc pump utilizing a valve that is similar to the valve of FIG. 3.

As shown in FIG. 5A, the valve 110 may be used in a disc pump 160 that operates at extremely high frequencies, beyond the range of human hearing. At such frequencies, the disc pump 160 may be extremely small in size and suitable for integration into a wide range of portable electronic devices where pressure or vacuum delivery is required. The disc pump 160 comprises a pump body 161 having a substantially cylindrical cavity 162 formed by a side wall 163 and closed at both ends by substantially circular end walls 164, 165 for containing a fluid. The disc pump 160 further comprises an actuator 166 operatively associated with the central portion of the end wall 165 to cause an oscillatory motion of the end wall 165 in a direction substantially perpendicular thereto with maximum amplitudes at about the center of the end wall 165, thereby generating displacement oscillations of the end wall 165 when in use. The disc pump 160 further comprises an isolator 167 operatively associated with the peripheral portion of the end wall 165 to reduce damping of displacement oscillations caused by the connection of the end wall 165 to the side wall 163 of the cavity 162. The disc pump 160 further comprises a central aperture 168 disposed at about the center of the end wall 164 and two secondary apertures 169 disposed between the center of the end wall 165 and the side wall 163. When the actuator 166 generates an oscillatory motion of the end wall 165, the displacement oscillations generate radial oscillations of the fluid pressure within the cavity 162 of the pump body 161 causing fluid flow through the central aperture 168 and secondary apertures 169 as indicated by the arrow 170 and arrows 171. The disc pump 160 also includes the valve 110 disposed in the central aperture 168 that allows fluid to flow through the central aperture 168 in only one direction. For the valve 110 to operate at high frequencies generated by the actuator 166, the valve 110 must have an extremely fast response time such that it is able to open and close on a time scale significantly shorter than the time scale of the pressure variations. An embodiment of the valve 110 is shown in the exploded view of FIG. 5C.

The valve 110, which is analogous to the valve 10 of FIG. 1, is disposed within the central aperture 168 so that the fluid is drawn into the cavity 162 through the central aperture 168 as indicated by the arrow 170. The fluid is expelled from the cavity 162 through the secondary apertures 169 as indicated by the arrows 171, thereby providing a source of reduced pressure at the central aperture 168. The term "reduced pressure" as used herein generally refers to a pressure less than the ambient pressure where the disc pump 160 is located. Although the terms "vacuum" and "negative pressure" may be used to describe the reduced pressure, the actual pressure reduction may be significantly less than the pressure reduction normally associated with a complete vacuum. The pressure is "negative" in the sense that it is a gauge pressure, i.e., the pressure is reduced below ambient atmospheric pressure. Unless otherwise indicated, values of pressure stated herein are gauge pressures. References to increases in reduced pressure typically refer to a decrease in absolute pressure, while decreases in reduced pressure typically refer to an increase in absolute pressure.

Figure 5B:
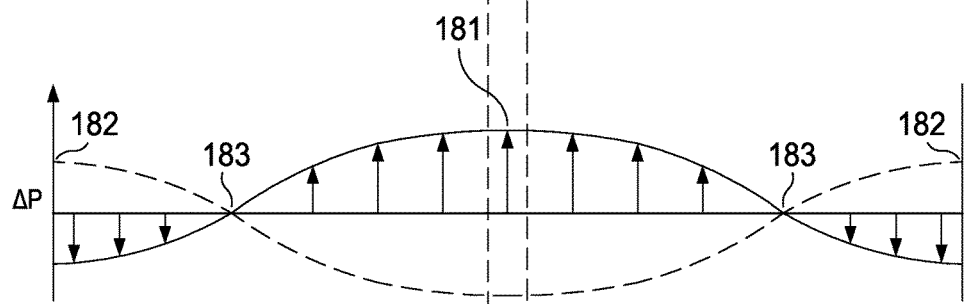
FIG. 5B shows a graph of pressure oscillations of fluid within the pump of FIG. 5A.

FIG. 5B shows one possible pressure oscillation profile illustrating the pressure oscillation within the cavity 162 resulting from the axial displacement oscillations of the end wall 165. The solid curved line and arrows represent the pressure at one point in time, and the dashed curved line represents the pressure one half-cycle later. In this mode and higher-order modes, the amplitude of the pressure oscillations has center pressure oscillations 181 around the center of the cavity 162 and peripheral pressure oscillations 182 near the side wall 163 of the cavity 162 corresponding to the center displacement oscillations and the peripheral displacement oscillations (not shown) of the end wall 165. The amplitude of the pressure oscillations is substantially zero at an annular pressure node 183 between the center pressure oscillations 181 and the peripheral pressure oscillations 182. The radial dependence of the pressure oscillations in the cavity 162 may be approximated by a Bessel function of the first kind. The radial change of the pressure is referred to as the "radial oscillations" of the fluid within the cavity 162 as distinguished from the axial pressure oscillations of the fluid within the cavity 162.

Figure 5C:
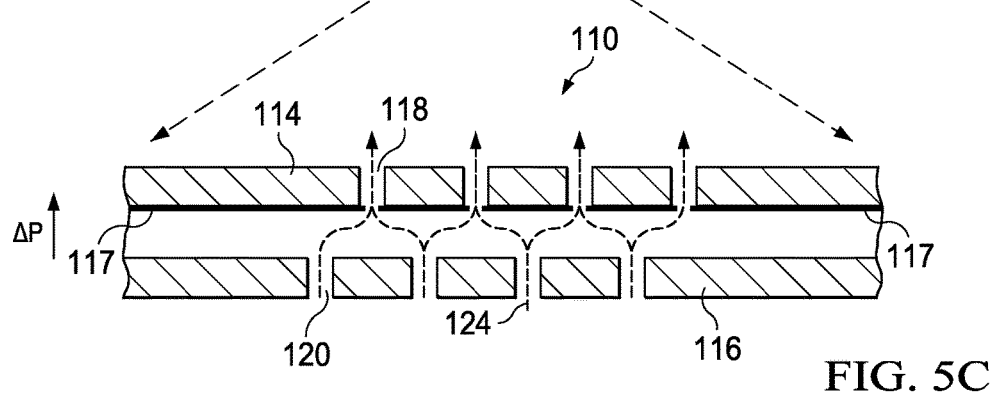
FIG. 5C shows a broken cross-section view of the valve of disc pump of FIG. 5A in an open position while fluid flows therethrough.

The fluid flow through the central aperture 168 as indicated by the arrow 170 corresponds to the fluid flow through the retention plate apertures 118 and sealing plate apertures 120 of the valve 110 as indicated by the dashed arrows 124 of FIG. 5C. As indicated above, the operation of the valve 110 is a function of the change in direction of the differential pressure ($\Delta P$) of the fluid across the entire surface of the retention plate 114 of the valve 110 for this embodiment of a negative pressure pump. The differential pressure ($\Delta P$) is assumed to be substantially uniform across the entire surface of the retention plate 114 because it corresponds to the center pressure oscillations 181 that are generated by the displacement oscillations of the end wall 165 and generally aligned by the central aperture 168.

When the differential pressure across the valve 110 reverses to become a positive differential pressure (+$\Delta P$), as shown in FIG. 7, the valve flap 117 is motivated away from the sealing plate 116 against the retention plate 114 into the open position. In this position, the movement of the valve flap 117 unblocks the sealing plate apertures 120 of the sealing plate 116 so that fluid is permitted to flow through them and the aligned retention plate apertures 118 of the retention plate 114 and the flap apertures 122 of the valve flap 117. When the differential pressure changes back to the negative differential pressure (−$\Delta P$), fluid begins to flow in the opposite direction through the valve 110 (see, e.g., FIG. 8), which forces the valve flap 117 back toward the closed position (see, e.g., FIG. 9). Thus, as the pressure oscillations in the cavity 162 cycle the valve 110 between the closed and open positions, the disc pump 160 provides a reduced pressure every half cycle when the valve 110 is in the open position.

Figures 6A, 6B:
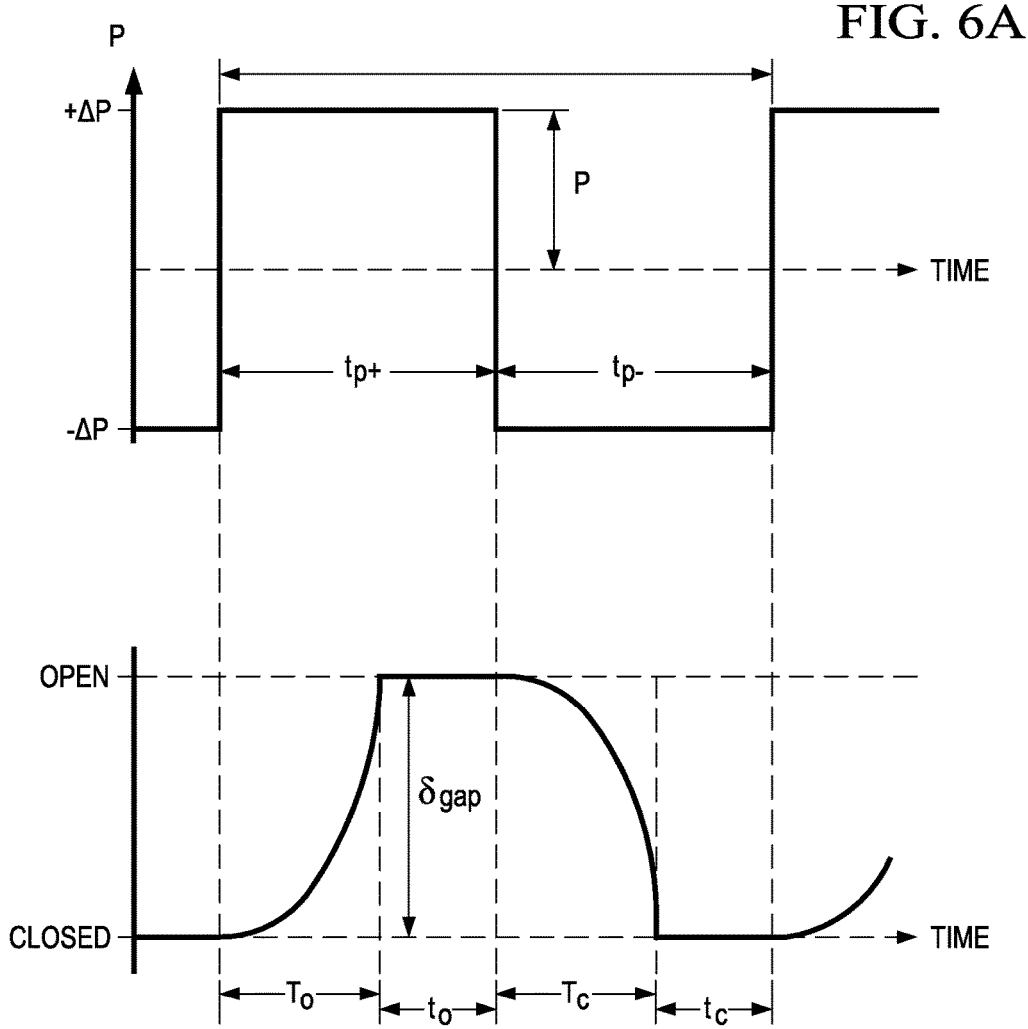
FIG. 6A shows a pressure graph of an oscillating differential pressure applied across the valves of FIGS. 1, 3, and 5C.
FIG. 6B shows a fluid-flow graph of an operating cycle of the valve of FIGS. 1, 3, and 5C between an open and closed position.

The differential pressure ($\Delta P$) is assumed to be substantially uniform across the entire surface of the retention plate 114 because it corresponds to the center pressure oscillations 181 as described above. Consequently, the cycling of the differential pressure ($\Delta P$) between the positive differential pressure (+$\Delta P$) and negative differential pressure (−$\Delta P$) values can be represented by a square wave over a positive pressure time period ($t_{p+}$) and a negative pressure time period ($t_{p-}$), respectively, as shown in FIG. 6A. As differential pressure ($\Delta P$) cycles the valve 110 between the closed and open positions, the disc pump 160 provides a reduced pressure every half cycle when the valve 110 is in the open position subject to an opening time delay ($T_o$) and a closing time delay ($T_c$) as shown in FIG. 6B. When the differential pressure across the valve 110 is initially negative with the valve 110 closed (see FIG. 9) and reverses to become a positive differential pressure (+$\Delta P$), the valve flap 117 is motivated away from the sealing plate 116 against the retention plate 114 into the open position (see FIG. 9) during the opening time delay ($T_o$). In this position, the movement of the valve flap 117 unblocks the sealing plate apertures 120 of the sealing plate 116 so that fluid is permitted to flow through them and the aligned retention plate apertures 118 of the retention plate 114 and the flap apertures 122 of the valve flap 117, thereby providing a source of reduced pressure outside the central aperture 168 of the disc pump 160 over an open time period ($t_o$). When the differential pressure changes back to the negative differential pressure (−$\Delta P$), fluid begins to flow in the opposite direction through the valve 110 (see FIG. 8) which forces the valve flap 117 back toward the closed position after the closing time delay ($T_c$). The valve 110 remains closed for the remainder of the half cycle or closed time period ($t_c$).

Upon start-up and during steady-state operation, the valve flap 117 is motivated between fully open and fully closed positions as shown in FIGS. 7-9. In steady-state operation, the operation of the valve 110 is a function of the change in direction of the differential pressure ($\Delta P$) of the fluid across the valve 110. In FIG. 8, the differential pressure has been assigned a negative value (−$\Delta P$) as indicated by the downward pointing arrow. In this embodiment, when the differential pressure has a negative value (−$\Delta P$), the fluid pressure on a retention plate side 134 of the valve 110 is greater than the fluid pressure on a sealing plate side 136 of the valve 110. This negative differential pressure (−$\Delta P$) drives the valve flap 117 into the fully closed position shown in FIG. 9. In the close position, the valve flap 117 is pressed against the sealing plate 116 to block the sealing plate apertures 120 in the sealing plate 116, thereby preventing the flow of fluid through the valve 110. When the differential pressure across the valve 110 reverses to become a positive differential pressure (+$\Delta P$) as indicated by the upward pointing arrow in FIG. 7, the valve flap 117 is motivated away from the sealing plate 116 and against the retention plate 114 into the open position. In this embodiment, when the differential pressure has a positive value (+$\Delta P$), the fluid pressure on the sealing plate side 136 of the valve 110 is greater than the fluid pressure on the retention plate side 134 of the valve 110. In the open position, the movement of the valve flap 117 unblocks the sealing plate apertures 120 of the sealing plate 116 so that fluid is able to flow through the sealing plate apertures 120 and the flap apertures 122 that align with the retention plate apertures 118, as indicated by the dashed arrows 124.

When the differential pressure changes back to a negative differential pressure (−$\Delta P$) as indicated by the downward pointing arrow in FIG. 8, fluid begins flowing in the opposite direction through the valve 110 as indicated by the dashed arrows 132, which forces the valve flap 117 back toward the closed position shown in FIG. 9. In FIG. 8, the fluid pressure moving between the valve flap 117 and the sealing plate 116 is lower than the fluid pressure between the valve flap 117 and the retention plate 114. Thus, the valve flap 117 experiences a net force, represented by arrows 138, which accelerates the valve flap 117 toward the sealing plate 116 to close the valve 110. In this manner, the changing differential pressure cycles the valve 110 between closed and open positions based on the direction (i.e., positive or negative) of the differential pressure across the valve 110.

Returning now to the valve 110 of FIG. 3, the retention plate 114 and the sealing plate 116 should be strong enough to withstand the fluid pressure oscillations to which the plates are subjected without significant mechanical deformation. The retention plate 114 and the sealing plate 116 may be formed from any suitable rigid material such as glass, silicon, ceramic, or metal. The retention plate apertures 118 and sealing plate apertures 120 may be formed by any suitable process including chemical etching, laser machining, mechanical drilling, powder blasting, and stamping. In one embodiment, the retention plate 114 and the sealing plate 116 are formed from sheet steel between about 100 and about 200 microns thick, and the retention plate apertures 118 and sealing plate apertures 120 are formed by chemical etching. The valve flap 117 may be formed from any lightweight material, such as a metal or polymer film. In one embodiment, when fluid pressure oscillations of about 20 kHz or greater are present on either the retention plate side 134 or the sealing plate side 136 of the valve 110, the valve flap 117 may be formed from a thin polymer sheet between about 1 micron and about 20 microns in thickness. For example, the valve flap 117 may be formed from polyethylene terephthalate (PET) or a liquid crystal polymer film approximately 3 microns in thickness.

In order to obtain an order of magnitude estimate for the maximum mass per unit area of the valve flap 117 according to one embodiment, the pressure oscillation across the valve 110 is again assumed to be a square wave as shown in FIG. 6A and that the full pressure differential is dropped across the valve flap 117. Further assuming that the valve flap 117 moves as a rigid body, the acceleration of the valve flap 117 away from the closed position when the differential pressure reverses from the negative to the positive value may be expressed as follows:

$$\ddot{x} = \frac{P}{m} \qquad \text{[Equation 1]}$$

where x is the position of the valve flap 117, $\ddot{x}$ represents the acceleration of the valve flap 117, P is the amplitude of the oscillating pressure wave, and m is the mass per unit area of the valve flap 117. Integrating this expression to find the distance, d, traveled by the valve flap 117 in a time t, i.e., the opening time delay ($T_o$), from the point of pressure reversal yields the following:

$$d = \frac{P}{2m}t^2 \qquad \text{[Equation 2]}$$

In one embodiment of the invention, the valve flap 117 should travel the distance between the retention plate 114 and the sealing plate 116, the valve gap ($v_{gap}$) being the perpendicular distance between the two plates, within a time period less than about one quarter (25%) of the time period of the differential pressure oscillation driving the motion of the valve flap 117, i.e., the time period of the approximating square wave ($t_{pres}$). Based on this approximation and the equations above, the mass per unit area of the valve flap 117(m) is subject to the following inequality:

$$m < \frac{P}{2d_{gap}} \frac{t_{pres}^2}{16}, \text{ or alternatively } m < \frac{P}{2d_{gap}} \frac{1}{16f^2} \qquad \text{[Equation 3]}$$

where $d_{gap}$ is the flap gap, i.e., the valve gap ($v_{gap}$) minus the thickness of the valve flap 117, and f is the frequency of the applied differential pressure oscillation (as illustrated in FIG. 6A). In one embodiment, P may be 15 kPa, f may be 20 kHz, and $d_{gap}$ may be 25 microns, indicating that the mass per unit area of the valve flap 117(m) should be less than about 60 grams per square meter. Converting from mass per unit area of the valve flap 117(m), the thickness of the valve flap 117 is subject to the following inequality:

$$\delta_{flap} < \frac{P}{2d_{gap}} \frac{1}{16f^2} \frac{1}{\rho_{flap}} \qquad \text{[Equation 4]}$$

where $\rho_{flap}$ is the density of the valve flap 117 material. Applying a typical material density for a polymer (e.g., approximately 1400 kg/m³), the thickness of the valve flap 117 according to this embodiment is less than about 45 microns for the operation of a valve 110 under the above conditions. The square wave shown in FIG. 6A is an approximation of the oscillating pressure waveform across the valve 110 as a result of, for example, the back pressure created when used in the disc pump 160. Therefore, a smaller portion of the pressure oscillation may be applied to the valve 110, thereby reducing the accelerating pressure difference and the initial acceleration of the valve flap 117 so that the opening time delay ($T_o$) increases. To compensate for the decreased acceleration of the valve flap 117, the thickness of the valve flap 117 may be reduced to satisfy the inequality of Equation 4. The valve flap 117 is thinner so that it accelerates more quickly to ensure that the opening time delay ($T_o$) less than about one quarter (25%) of the time period of the differential pressure oscillation ($t_{pres}$).

Minimizing the pressure drop incurred as air flows through the valve 110 is important to maximizing valve performance as it affects both the maximum flow rate and the stall pressure that are achievable. Reducing the size of the valve gap ($v_{gap}$) between the plates or the diameter of the retention plate apertures 118 and sealing plate apertures 120 increases the flow resistance and increases the pressure drop through the valve 110. According to another embodiment of the invention, the following analysis may employ steady-state flow equations to approximate flow resistance through the valve 110 to improve the operation of the valve 110. The pressure drop for flow through a hole, such as a retention plate aperture 118 or sealing plate aperture 120, can be estimated using the Hagan-Pouisille equation:

$$\Delta p_{hole} = \frac{128 \mu q t_{plate}}{\pi d_{hole}^3} \qquad \text{[Equation 5]}$$

where μ is the fluid dynamic viscosity, q is the flow rate through the hole and $t_{plate}$ is the plate thickness.

When the valve 110 is in the open position as shown in FIG. 7, the flow of fluid through the gap between the valve flap 117 and the sealing plate 116 (the gap is the same value as the flap gap $d_{gap}$) will propagate generally radially through the gap after exiting the sealing plate aperture 120 before contracting radially into the retention plate aperture 118. If the pattern of the retention plate apertures 118 and sealing plate apertures 120 is a square array with a sealing length, s, between the holes on one plate to the holes on the other plate as shown in FIGS. 2 and 4, the total pressure drop of the valve 110 may be approximated by the following equation:

$$\Delta p_{gap} = \frac{6 \mu q}{\pi d_{gap}^3} \ln\left(2\left(\frac{s}{d_{hole}} + 1\right)^2\right) \qquad \text{[Equation 6]}$$

Thus, the total pressure drop (approximately $\Delta p_{gap} + 2 \ast \Delta p_{hole}$) can be very sensitive to changes in the diameter of the retention plate apertures 118 and sealing plate apertures 120 and the flap gap $d_{gap}$ between the valve flap 117 and the sealing plate 116. It should be noted that a smaller flap gap $d_{gap}$, which can be desirable in order to minimize the opening time delay ($T_o$) and the closing time delay ($T_c$) of the valve 110, may increase the pressure loss. According to the equation above, reducing the flap gap $d_{gap}$ from 25 microns to 20 microns doubles the pressure loss.

Consideration also should be given to maintaining the stress experienced by the valve flap 117 within acceptable limits during operation of the valve 110, which typically requires a larger diameter for the sealing plate apertures 120. Equating the equations above for hole and gap pressure drops suggests a flap gap $d_{gap}$ value at which the valve gap pressure drop is equal to the hole pressure drop. In practice, this calculation sets an upper limit on the flap gap $d_{gap}$. In one embodiment, the flap gap $d_{gap}$ falls within an approximate range between about 5 microns and about 150 microns, although more preferably within a range between about 15 and about 50 microns depending on other factors as described below in more detail.

FIG. 9 illustrates a portion of the valve 110 of FIG. 3 in the closed position. In this position, the valve flap 117 is subjected to stress as the valve flap 117 seals and blocks the sealing plate aperture 120, causing the valve flap 117 to deform in the shape of a dimple extending into the opening of the sealing plate apertures 120. The level of stress on the valve flap 117 in this configuration increases with the diameter of the sealing plate apertures 120 for a given valve flap 117 thickness. The valve flap 117 material will tend to fracture more easily if the diameter of the sealing plate apertures 120 is too large, thus leading to failure of the valve 110. In order to reduce the likelihood that the valve flap 117 material fractures, the hole diameter of the sealing plate aperture 120 may be reduced to limit the stress experienced by the valve flap 117 in operation to a level which is below the fatigue stress of the valve flap 117 material.

The maximum stress experienced by the valve flap 117 material in operation may be estimated using the following two equations:

$$\frac{\Delta p_{max} r_{hole}^4}{Et^4} = K_1 \frac{y}{t} + K_2 \left(\frac{y}{t}\right)^3 \quad \text{[Equation 7]}$$

$$\frac{\sigma_{max} r_{hole}^2}{Et^2} = K_3 \frac{y}{t} + K_4 \left(\frac{y}{t}\right)^2 \quad \text{[Equation 8]}$$

where $r_{hole}$ is the radius of the hole of the sealing plate aperture 120, t is the valve flap 117 thickness, y is the valve flap 117 deflection at the center of the hole, $\Delta p_{max}$ is the maximum pressure difference experienced by the valve flap 117 when sealed, E is the Young's Modulus of the valve flap 117 material, and $K_1$ to $K_4$ are constants dependant on the details of the boundary conditions and the Poisson ratio of the valve flap 117. For a given valve flap 117 material and geometry of the sealing plate apertures 120, Equation 7 can be solved for the deformation, y, and the result then used in Equation 8 to calculate stress. For values of y<<t, the cubic and squared y/t terms in Equations 7 and 8 respectively become small and these equations simplify to match small plate deflection theory. Simplifying these equations results in the maximum stress being proportional to the radius of the sealing plate apertures 120 squared and inversely proportional to the valve flap 117 thickness squared. For values of y>>t or for flaps that have no flexural stiffness, the cubic and squared y/t terms in the two equations become more significant so that the maximum stress becomes proportional to the radius of the hole to the power ⅔ and inversely proportional to the valve flap 117 thickness to the power ⅔.

In one embodiment of the invention, the valve flap 117 is formed from a thin polymer sheet, such as Mylar having a Poisson ratio of 0.3, and is clamped to the sealing plate 116 at the edge of the sealing plate apertures 120. The constants $K_1$ to $K_4$ can be estimated as 5.86, 2.86, 4.40, and 1.73, respectively. Using these values in Equations 7 and 8 and assuming that the thickness of the valve flap 117 is about 3 microns with a Young's Modulus of 4.3 GPa under 500 mbar pressure difference, the deflection (y) of the valve flap 117 will be approximately 1 µm for a hole radius of 0.06 mm, about 4 µm for a hole radius of 0.1 mm, and about 8 µm for a hole radius of 0.15 mm. The maximum stresses under these conditions will be 16, 34, and 43 MPa, respectively. Considering the high number of stress cycles applied to the valve flap 117 during the operation of the valve 110 at high frequencies above the audible range, the maximum stress per cycle tolerated by the valve flap 117 should be significantly lower than the yield stress of the valve flap 117 material in order to reduce the possibility that the valve flap 117 suffers a fatigue fracture, especially at the dimple portion of the valve flap 117 extending into the sealing plate apertures 120. Based on fatigue data compiled for a high number of cycles, it has been determined that the actual yield stress of the valve flap 117 material should be at least about four times greater than the stress applied to the valve flap 117 material (e.g., 16, 34, and 43 MPa as calculated above). Thus, the valve flap 117 material should have a yield stress as high as 150 MPa to minimize the likelihood of such fractures for a maximum hole diameter in this case of approximately 200 microns.

Reducing the diameter of the sealing plate apertures 120 beyond this point may be desirable as it further reduces valve flap 117 stress and has no significant effect on valve flow resistance until the diameter of the sealing plate apertures 120 approach the same size as the flap gap $d_{gap}$. Further, reduction in the diameter of the sealing plate apertures 120 permits the inclusions of an increased number of sealing plate apertures 120 per unit area of the valve 110 surface for a given sealing length (s). However, the size of the diameter of the sealing plate apertures 120 may be limited, at least in part, by the manner in which the plates of the valve 110 were fabricated. For example, chemical etching limits the diameter of the sealing plate apertures 120 to be equal to or greater than the thickness of the plates in order to achieve repeatable and controllable results. In one embodiment, the sealing plate apertures 120 in the sealing plate 116 are between about 20 microns and about 500 microns in diameter, and in other embodiments more preferably between about 100 and about 200 microns in diameter depending on the other factors described above.

The performance of a disc pump 160 that includes the valve 110 can be enhanced by optimizing the valve 110 because the efficiency of the disc pump 160 is directly linked to the performance of the valve 110. The valve 110 performance, in turn, is directly related to the response time (i.e., the opening time delay $T_o$ and closing time delay $T_c$) of the valve flap 117 within the valve 110. The response time may be reduced by decreasing the mass of the moving portion of the valve flap 117 by, for example, including low-mass areas 121. Including the low-mass areas 121 in the valve flap 117 may reduce the magnitude of the pressure differential required to move the valve flap 117 from the closed position to the open position, and from the open position to the closed position. In addition, reducing the mass of the valve flap 117 may reduce the stress applied to portion of the valve 110 that supports the valve flap 117, thereby effectively strengthening the supporting structure of the valve 110.

Because the disc pump 160 operates at a low-ultrasonic frequency, the valve flap 117 may benefit from having minimal inertia to enable a quick response time. In other embodiments of a disc pump valve, features may be included in other valve components, e.g., the retention plate 114 and sealing plate 116, to reduce the response time of the valve flap 117. For example, a valve 110 may have relief holes formed in the retention plate 114 or sealing plate 116 to reduced sticking of the valve flap 117 to the retention plate 114 or sealing plate 116. Sticking may increase the response time of the valve and is understood to be a function of the contact area between the valve flap 117 and the retention plate 114 or sealing plate 116. In an embodiment, the low-mass areas 121 in the valve flap 117 reduce sticking and alleviate the need for such relief holes in the retention plate 114 and sealing plate 116. An added benefit of removing relief holes from the retention plate 114 and sealing plate 116 is increased strength of the respective plates.

In other embodiments, pump performance may be improved by using lighter materials to form the valve flap 117 and increasing the size of the gap between the retention plate 114 and sealing plate 116. Using lighter materials that undergo more deformation to accommodate a larger gap risks shortening the lifetime of the pump. In the embodiment described above with regard to FIG. 1, low-mass areas 21 are included to lighten and increase the flexibility of the valve flap 17, without requiring the use of a lighter, weaker flap material. The low-mass areas 21 of the valve flap 17 may supply a number of benefits, including reducing the minimal pressure required to open the valve 10 by reducing sticking. Reducing sticking decreases the magnitude of the pressure differential required to open and close the valve 10, and thereby increases air flow through the valve 10. As such, in an embodiment, the low-mass areas 21 in the valve flap 17 are placed at optimal locations to enable stretching of the valve flap 17 to accommodate a larger gap between the retention plate 14 and the sealing plate 16.

Modifying the stretch properties of the valve flap 17 by incorporating low-mass areas 21 of varying sizes and locations on the valve flap 17 can also increase the speed and range of motion of the valve flap 17 in the areas of the valve flap 17 where fluid flow and material flexibility is desired. Placement of the low-mass areas 21 away from locations where a stronger material is desired, such as near the portion of the valve flap 17 that attaches to the sealing plate 16 and annular member 12, enables the valve flap 17 to retain strength. The inclusion of low-mass areas 21 results in the ability to increase flexibility in some portions of the valve flap 17 while maintaining strength in other portions of the valve flap 17, thereby enabling a wider range of materials and valve flap 17 dimensions. For example, materials may be selected to offer better wear, stretch, or grain characteristics, thereby improving the ability of the disc pump 160 to achieve greater flows with a valve design which has a larger valve gap, perhaps beyond 60 microns. The low-mass areas 121 may also enable the use of stiffer materials to form the valve flap 117 because the low-mass areas 121 would negate the negative consequences, such as increased weight and a slower response time, that are typically associated with the use of a stiffer material.

Figure 10:
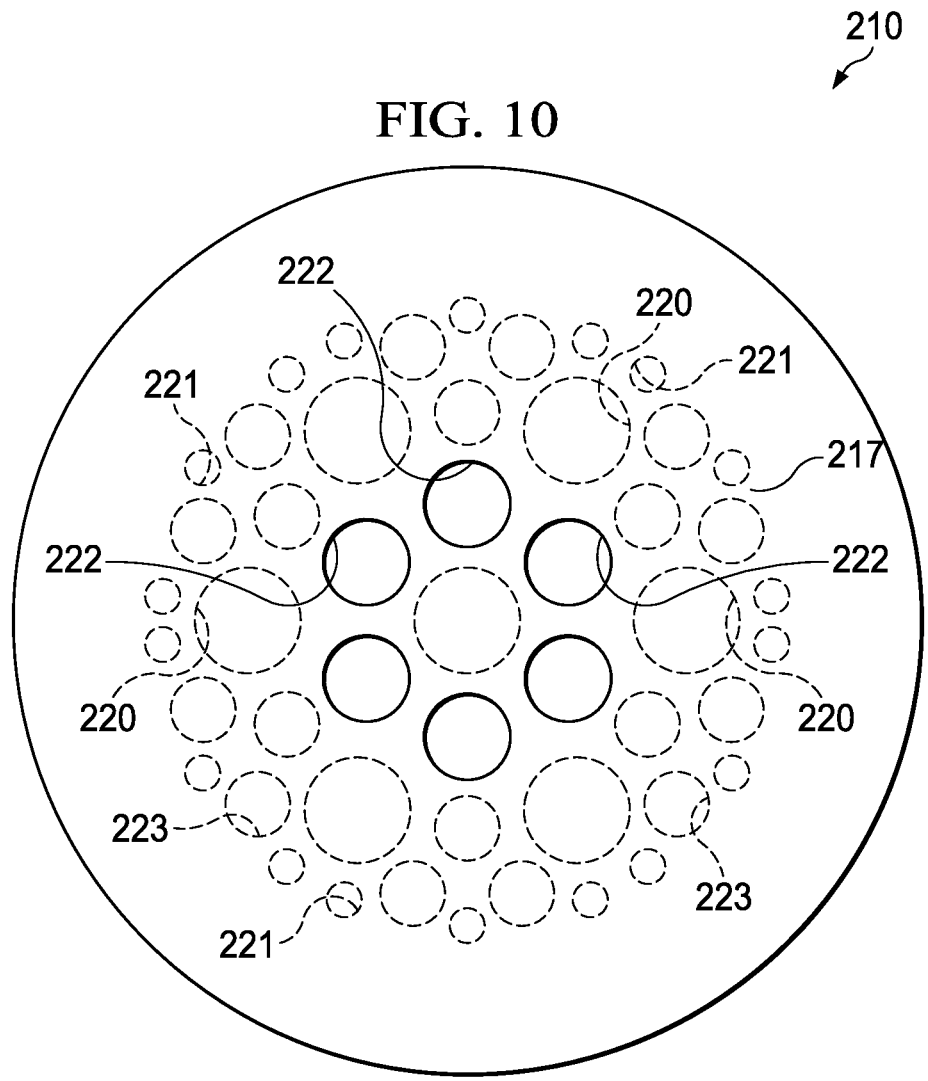
FIG. 10 shows a top view of an illustrative embodiment of a disc pump valve having both larger low-mass areas and smaller low-mass areas.

FIG. 10 shows an alternative embodiment of a valve 210 that is similar to the valve of FIGS. 1-9. In the embodiment of FIG. 10, low-mass areas of varying sizes may be located on the valve flap 217 to maximize the effectiveness of the valve flap 217. For example, larger low-mass areas 223 may be located near the center of the valve flap 217 where the valve flap 217 experiences less stretching but more displacement as the valve flap 217 moves between sealing plate and retention plate (not shown). Conversely, smaller low-mass areas 221 may be located closer to the periphery of the valve flap 217 where the valve flap 217 experiences less displacement but more stretching. These smaller low-mass areas 221 and larger low-mass areas 223 may include apertures, indentations, or a combination thereof. In the embodiment of FIG. 10, the smaller low-mass areas 221 remove less material, resulting in increased strength in the portion of the valve flap 217 that undergoes more stretching but less displacement, and increased flexibility in the portion of the valve flap 217 that undergoes more displacement.

In another embodiment, the low-mass areas may comprise thinned areas, such as dimples or indentations that are formed by, for example, etching techniques. To form such dimples or indentations, the valve flap material may be partially etched to reduce the thickness of the valve flap 217 by a predetermined amount without forming an aperture in the valve flap 217. The etched areas may provide localized areas having high strength and high mass or etched areas having less strength and less mass. Using partially etched regions to form the low-mass areas may also increase the sealing ability of the valve flap 217 by increasing the localized pressure on un-etched areas of the valve flap 217 that contact the sealing plate 216 and support the valve flap 217. Thus, the stiffness properties of the valve flap 217 across the footprint of the valve flap 217 can be modified and optimized to enhance contact and sealing around the sealing plate apertures 220.

It should be apparent from the foregoing that an invention having significant advantages has been provided. While the invention is shown in only a few of its forms, it is not just limited but is susceptible to various changes and modifications without departing from the spirit thereof.

We claim:

1. A disc pump valve for controlling the flow of fluid through a disc pump, the disc pump valve comprising:
   a first plate having first plate apertures extending generally perpendicular through the first plate;
   a second plate having second plate apertures extending generally perpendicular through the second plate, the second plate apertures being substantially offset from the first plate apertures;
   a sidewall disposed between the first plate and the second plate, the sidewall being closed around the perimeter of the first plate and the second plate to form a cavity between the first plate and the second plate;
   a valve flap disposed and moveable between the first plate and the second plate, the valve flap having flap apertures that overlie the second plate apertures and are offset from the first plate apertures to comprise a solid sheet in areas of the valve flap that overlie the first plate apertures; and
   a plurality of indentations formed in the valve flap in portions of the valve flap interstitial to both the first plate apertures and the second plate apertures, the indentations varying in frequency and having a lower frequency of indentations near the periphery of the valve flap and a higher frequency of indentations near the center of the valve flap;

whereby the valve flap is motivated between the first plate and the second plate in response to a change in direction of the differential pressure of the fluid outside the valve.

2. The disc pump valve of claim 1, wherein indentations have varying sizes.

3. The disc pump valve of claim 1, wherein: the indentations vary from smaller indentations to larger indentations, the smaller indentations being located near the periphery of the valve flap and the larger indentations being located near the center of the valve flap.

4. A method of manufacturing a disc pump valve for controlling the flow of fluid through a disc pump, the method comprising:
- providing a first plate having first plate apertures extending generally perpendicular through the first plate;
- providing a second plate having second plate apertures extending generally perpendicular through the second plate, the second plate apertures being substantially offset from the first plate apertures;
- providing a sidewall disposed between the first plate and the second plate to form a cavity between the first plate and the second plate; and
- providing a valve flap between the first plate and the second plate, the valve flap comprising:
  - flap apertures that overlie the second plate apertures and are offset from the first plate apertures to comprise a solid sheet in areas of the valve flap that overlie the first plate apertures, and
  - indentations formed in portions of the valve flap interstitial to both the first plate apertures and the second plate apertures, the indentations varying in frequency and having a lower frequency of indentations near the periphery of the valve flap and a higher frequency of indentations near the center of the valve flap.

5. A disc pump comprising:
- a pump body having a substantially elliptically shaped side wall closed at one end by an end wall and the other end by a pair of internal plates adjacent each other to form a cavity within the pump body for containing fluids;
- an actuator formed by the internal plates wherein one of the internal plates is operatively associated with a central portion of the other internal plate and adapted to cause an oscillatory motion at a frequency (f) thereby generating radial pressure oscillations of the fluid within the cavity;
- a first aperture extending through the actuator to enable fluid to flow through the cavity;
- a second aperture extending through the end wall to enable the fluid to flow through the cavity; and
- a disc pump valve disposed in at least one of the first aperture and second aperture, the valve comprising:
  - a first plate having first plate apertures extending generally perpendicular through the first plate,
  - a second plate having second plate apertures extending generally perpendicular through the second plate, the second plate apertures being substantially offset from the first plate apertures,
  - a sidewall disposed between the first plate and the second plate to form a cavity between the first plate and the second plate, and
  - a valve flap disposed between the first plate and the second plate, the valve flap comprising:
    - flap apertures that overlie the second plate apertures and are offset from the first plate apertures to comprise a solid sheet in areas of the valve flap that overlie the first plate apertures, and
    - indentations in portions of the valve flap interstitial to both the first plate apertures and the second plate apertures, the indentations varying in frequency and having a lower frequency of indentations near the periphery of the valve flap and a higher frequency of indentations near the center of the valve flap.

* * * * *